United States Patent
Honda et al.

(10) Patent No.: US 9,367,751 B2
(45) Date of Patent: Jun. 14, 2016

(54) OBJECT DETECTION DEVICE FOR AREA AROUND VEHICLE

(71) Applicant: ICHIKOH INDUSTRIES, LTD., Isehara-shi, Kanagawa-ken (JP)

(72) Inventors: Keisuke Honda, Isehara (JP); Hideto Kurimoto, Isehara (JP)

(73) Assignee: ICHIKOH INDUSTRIES, LTD., Isehara-Shi (JP)

(*) Notice: Subject to any disclaimer, the term of this patent is extended or adjusted under 35 U.S.C. 154(b) by 0 days.

(21) Appl. No.: 14/409,288

(22) PCT Filed: Jun. 13, 2013

(86) PCT No.: PCT/JP2013/066331
§ 371 (c)(1),
(2) Date: Dec. 18, 2014

(87) PCT Pub. No.: WO2013/191078
PCT Pub. Date: Dec. 27, 2013

(65) Prior Publication Data
US 2015/0169969 A1 Jun. 18, 2015

(30) Foreign Application Priority Data
Jun. 19, 2012 (JP) ................................. 2012-137737

(51) Int. Cl.
*G06K 9/00* (2006.01)
*G06K 9/20* (2006.01)
(Continued)

(52) U.S. Cl.
CPC ........ *G06K 9/00805* (2013.01); *G06K 9/00798* (2013.01); *G06K 9/2054* (2013.01); *G06T 7/0081* (2013.01); *G06T 7/0097* (2013.01);
(Continued)

(58) Field of Classification Search
CPC ................... G06K 2009/3225; G06K 9/3216; G06T 7/2053
USPC .......................................... 382/103, 104, 107
See application file for complete search history.

(56) References Cited

U.S. PATENT DOCUMENTS 5,809,161 A * 9/1998 Auty ......................... G01P 3/38
340/937
6,141,435 A 10/2000 Naoi et al.
(Continued)

FOREIGN PATENT DOCUMENTS

JP 06-337938 A 12/1994
JP 2000-315255 A 11/2000
(Continued)

*Primary Examiner* — Tom Y Lu
(74) *Attorney, Agent, or Firm* — Foley & Lardner LLP

(57) ABSTRACT

This object detection device for the area around a vehicle is provided with an imaging device and an image processing device. The image processing device is configured from a detection area setting unit, three area processing units, and an integration processing unit. The detection area setting unit sets a trio of small, medium, and large detection areas within a one-frame image captured by the imaging device. Detection processing for the presence of objects within the trio of small, medium, and large detection areas is carried out for each detection area simultaneously and in parallel by the three area processing units using pattern matching. The integration processing unit integrates the plurality of detection results resulting from detection processing by the plurality of area processing units and outputs the result. As a result, the present invention makes it possible to reduce the amount of time required for detection processing.

5 Claims, 6 Drawing Sheets

(51) Int. Cl.
   *G08G 1/16*    (2006.01)
   *G06T 7/00*    (2006.01)

(52) U.S. Cl.
   CPC ...... *G08G 1/166* (2013.01); *G06T 2207/10004* (2013.01); *G06T 2207/20021* (2013.01); *G06T 2207/30196* (2013.01); *G06T 2207/30256* (2013.01); *G06T 2207/30261* (2013.01)

(56) References Cited

U.S. PATENT DOCUMENTS

| | | | |
|---|---|---|---|
| 6,292,111 | B1 | 9/2001 | Ishikawa et al. |
| 2002/0126875 | A1 | 9/2002 | Naoi et al. |
| 2005/0189471 | A1* | 9/2005 | Nagasawa ............. G06T 7/2053 250/208.1 |
| 2010/0260377 | A1* | 10/2010 | Takahashi ............. G06T 7/2053 382/103 |
| 2012/0183177 | A1* | 7/2012 | Ku ..................... G06K 9/00771 382/103 |
| 2012/0269382 | A1* | 10/2012 | Kiyohara ............... G01C 21/26 382/103 |
| 2013/0064425 | A1* | 3/2013 | Sagawa ............. G06K 9/00221 382/103 |

FOREIGN PATENT DOCUMENTS

| | | |
|---|---|---|
| JP | 2002-140706 A | 5/2002 |
| JP | 2008-257378 A | 10/2008 |
| JP | 2011-210087 A | 10/2011 |

* cited by examiner

OBJECT DETECTION DEVICE FOR AREA AROUND VEHICLE

TECHNICAL FIELD

The present invention relates to an object detection device for area around vehicle to detect whether an object (such as another vehicle or pedestrian) is present or absent around a vehicle, on the basis of a vehicle periphery image.

BACKGROUND ART

An object detection device for area around vehicle of such type is conventionally known (for example, Patent Literature 1). Hereinafter, a conventional detection device for area around vehicle will be described.

The conventional detection device for area around vehicle of Patent Literature 1 scans a detection window in a vehicle periphery image of one frame, and compares an image in the detection window and a reference image with each other to thereafter detect whether an object is present or absent around a vehicle.

CITATION LIST

Patent Literature

Patent Literature 1: Japanese Unexamined Patent Application Publication No. 2011-210087

SUMMARY OF THE INVENTION

Problems to be Solved by the Invention

However, in the conventional detection device for area around vehicle, a detection window is set to a fixed size and then the detection window is scanned while the vehicle periphery image of one frame is resized by increasing or decreasing the image in a plurality of steps; and therefore, a detection processing time is extended.

A problem to be solved by the present invention is that the detection processing time is extended in the conventional object detection device for area around vehicle.

A first aspect of the present invention, an object detection device for area around vehicle, comprising: an image device to capture a periphery of the vehicle as an image; and an image processing device to process an image of the periphery of the vehicle which is captured by the imaging device and then output a detection result, wherein the image processing device is comprised of: a detection area setting unit to set a plurality of detection areas of different sizes in the image of one frame; a plurality of area processing units to respectively carry out detection processing operations as to whether the object is present or absent simultaneously in parallel to each other by object detection method that using pattern matching or feature amount (for example Haar-Like) or HOC or the like, in the plurality of the detection areas of different sizes that are set by the detection area setting unit; and an integration processing unit to integrate and output a plurality of detection results that are respectively processed to be detected by the plurality of the area processing units.

A second aspect of the present invention, the object detection device for area around vehicle, wherein: the detection area of a large size is a proximal area of the vehicle, the detection area of a small size is a distal area of the vehicle, and the detection area of the large size includes the detection area of the small size.

A third aspect of the present invention, the object detection device for area around vehicle, wherein the image processing device is comprised of: a white line detection processing unit to carry out detection processing of a white line of a road; the detection area setting unit to set the detection area of the large size and to set the detection area of the small size, according to the white line that is processed to be detected at the white line detection processing unit; and the plurality of the area processing units; and the integration processing unit.

A fourth aspect of the present invention, the object detection device for area around vehicle, comprising a detection device to detect vehicle information, wherein the image processing device is comprised of: a travel path estimation unit to estimate a travel path of the vehicle, based on the vehicle information from the detection device; the detection area setting unit to set the detection area of the large size to a default, to set the detection area of the small size, according to the travel path, or alternatively, to set the detection area of the small size to a default, based on an estimation result from the travel path estimation unit; the plurality of the area setting units; and the integration processing units.

A fifth aspect of the present invention, the object detection device for area around vehicle, comprising a detection device to detect vehicle information, wherein the image processing device is comprised of: a white line detection processing unit to carry out detection processing of a white line of a road; a travel path estimation unit to estimate the travel path of the vehicle, based on the vehicle information from the detection device; the detection area setting unit to set the detection area of the large size, and to set the detection area of the small size, according to the white line that is processed to be detected at the white line detection processing unit or alternatively, to set the detection area of the large size to a default, based on the white line detection processing unit, and to set the detection area of the small size, according to the travel path, or alternatively, to set the detection area of the small size to a default based on an estimation result from the travel path estimation unit; the plurality of the area processing units; and the integration processing unit.

A sixth aspect of the present invention, the object detection device for area around vehicle, wherein the detection area that is set by the detection area setting unit is made of: the detection area of a large size; the detection area of a small size; and one or a plurality of intermediate detection areas which is or are set between the detection area of the large size and the detection area of the small size.

Effect of the Invention

In an object detection device for area around vehicle, of the present invention, an image of one frame is set in a plurality of detection areas of different sizes; in the plurality of detection areas of different sizes in which the image is set, detection processing operations as to whether an object is present or absent are respectively carried out simultaneously in parallel with each other by way of pattern matching; and therefore, the detection processing time can be reduced in comparison with a case in which detection processing is carried out while an image of one frame is employed as that of a detection area.

MODE FOR CARRYING OUT THE INVENTION

Hereinafter, one of embodiments (examples) of an object detection device for area around vehicle, according to the present invention, will be described in detail with reference to the drawings. It is to be noted that the present invention is not limited by the embodiment. In the specification and claims, the terms "front", "rear", "top", "bottom", "left", and "right" respectively designate the front, rear, top, bottom, left, and right when the object detection device for area around vehicle, according to the present invention, is mounted to a vehicle D.

(Description of Configuration of Embodiment)

Figure 1:
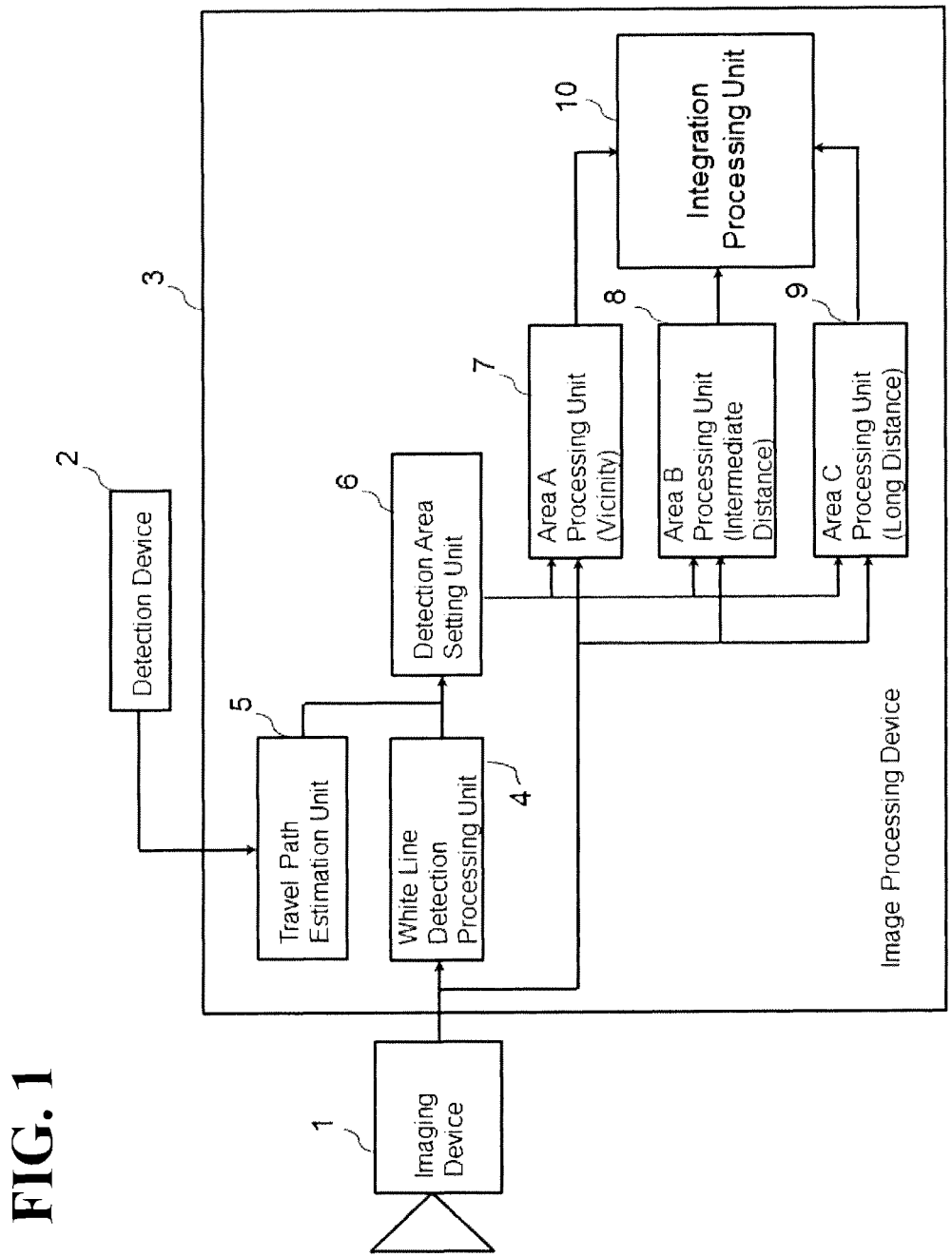
FIG. 1 is a functional block diagram of an entire configuration showing an embodiment of an object detection device for area around vehicle, according to the present invention.

Hereinafter, a configuration of an object detection device for area around vehicle, according to the embodiment, will be described. The object detection device for area around vehicle, according to the embodiment, as shown in FIG. 1, is provided with an imaging device (a camera) 1, detection unit 2, and an image processing device (an image processing ECU) 3.

(Description of Imaging Device 1)

The imaging device 1 is mounted to each of the left and right sides of a vehicle D. For example, this imaging device is mounted to an outside mirror device which is mounted to each of the left and right doors of the vehicle D, for example, to a mirror base of a door mirror device (not shown), or alternatively, on a vehicle body of the vehicle D.

Hereinafter, the imaging device 1 mounted to the right side of the vehicle D will be described. It is to be noted that the imaging device 1 mounted to the left side of the vehicle D employs a configuration which is substantially identical to that of the imaging device 1 mounted to the right side of the vehicle D, and captures an image which is transversely symmetrical to an image captured by the imaging unit 1 mounted to the right side of the vehicle D; and therefore, a duplicate description thereof is omitted.

Figure 2:
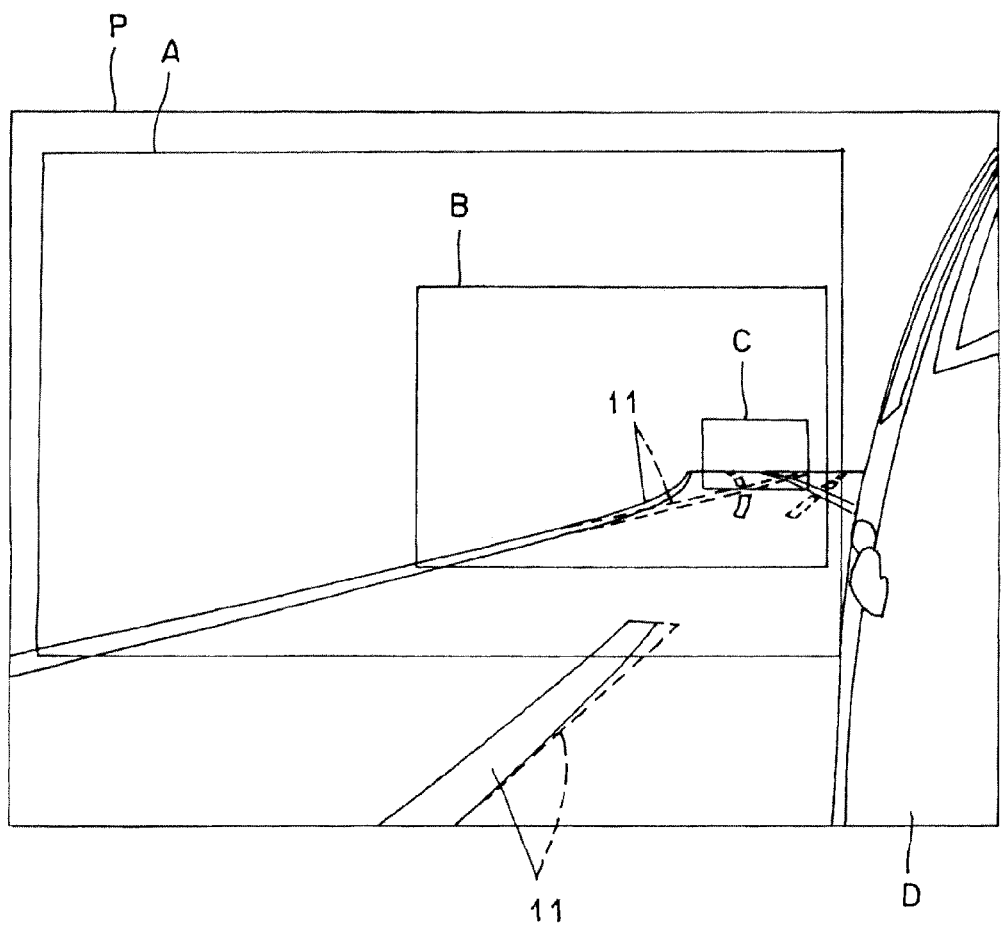
FIG. 2 is an explanatory view showing a state in which an image of one frame at the rear right of a vehicle is set in three detection areas of different sizes.
Figure 3:
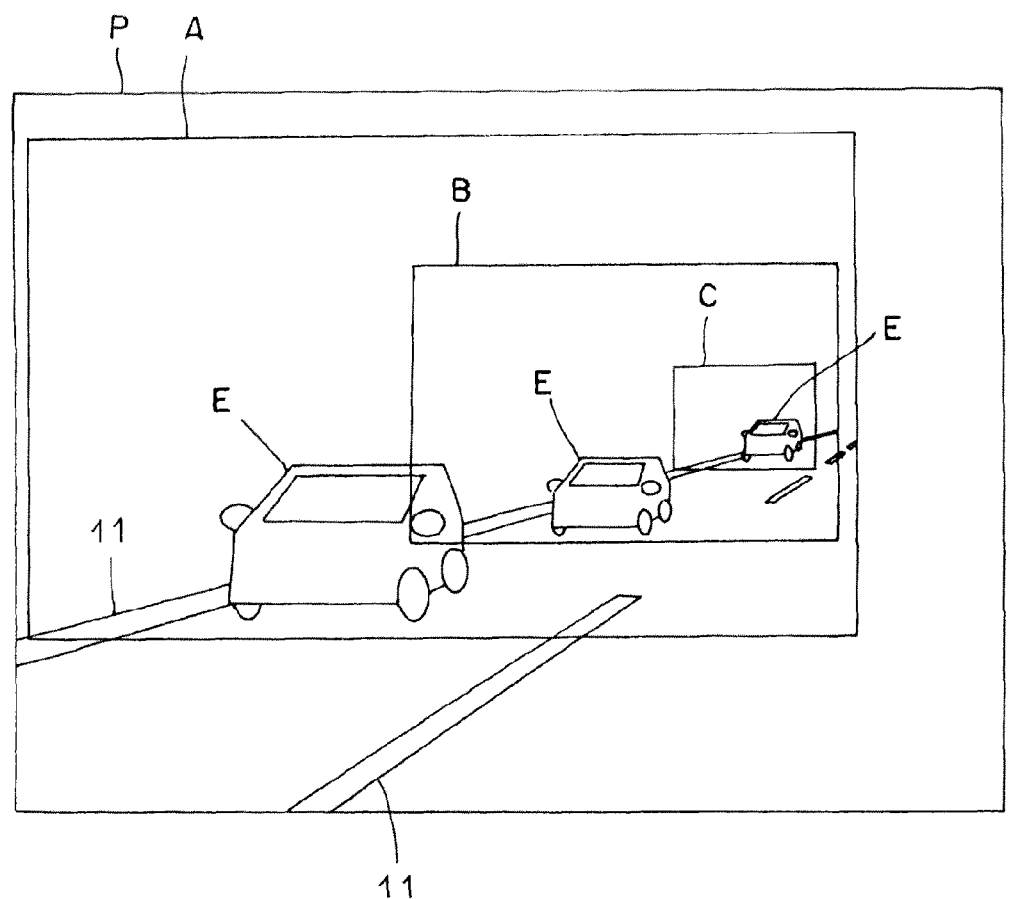
FIG. 3 is an explanatory view showing three detection areas of different sizes which are set in an image of one frame.

The imaging device 1 is connected to the image processing device 3. The imaging device 1 captures information about a rear lateral side (a rear right side) around the vehicle D, as shown in FIG. 2 and FIG. 3 in this example, and outputs the captured vehicle periphery information as image data (refer to FIG. 2 and FIG. 3) to the image processing device 3.

(Description of Detection Device 2)

The detection device 2 is connected to the image processing device 3. The detection device 2 detects information about the vehicle D required to estimate a travel path of the vehicle D (hereinafter, this vehicle may also be referred to as a "cruising vehicle D), and outputs the detected vehicle information as a detection signal to the image processing device 3. As the detection device 2, a vehicle speed sensor (not shown), a steering angle sensor (not shown), a yaw rate sensor (not shown), or an acceleration sensor (not shown) is used solely or in combination of a plurality thereof.

(Description of Image Processing Device 3)

The image processing device 3 is connected to a respective one of the imaging device 1 and the detection unit 2.

The image processing device 3 carries out detection processing as to whether another vehicle E which is an object is present or absent in an image P of the periphery of the vehicle D which is captured by the imaging device 1, and outputs a result of the detection processing.

The image processing device 3, as shown in FIG. 1, is composed of: a white line detection processing unit 4; a travel path estimation unit 5; a detection area setting unit 6; a plurality of, in this example, three area processing units (an area A processing unit (vicinity) 7, an area B processing unit (intermediate distance) 8, and an area C processing unit (long distance) 9); and an integration processing unit 10.

The white line detection processing unit 4 carries out detection processing of a white line 11 of a road. That is, the white line detection processing unit 4 digitizes the image P from the imaging device 1 in terms of contrast by a predetermined threshold value as to the luminous intensity of each pixel, and detects the white line 11 with a bright matter being defined as white, on the basis of the digitized data. The white line detection processing unit 4 outputs a result of the detection processing of the white line 11 (for example, the white line 11 is present or the white line 11 is absent) to the detection area setting unit 6.

In FIG. 2, the white line 11 indicated by the solid line is a white line along a curved road. In FIG. 2, the white line 11 indicated by the dashed line is a white line along a straight road. As shown in FIG. 2, a gap between the white line 11 of the curved road and the white line 11 of the straight road increases as it goes to the rear side (distal side) of the vehicle D. It is to be noted that the white line 11 in FIG. 3 is a white line along the straight road.

The travel path estimation unit 5 estimates a travel path of the vehicle D on the basis of the vehicle information from the detection device 2. That is, the travel path estimation unit 5 estimates whether the vehicle D is travelling on a straight road or is travelling on a curved road, or alternatively, the vehicle is turning to the left or right at an intersection.

For example, the travel path estimation unit 5 estimates the travelling road of the vehicle D as a straight road in a case where a vehicle speed of a detection signal of the vehicle speed sensor is a threshold value or more and a steering angle of a detection signal of the steering angle sensor is less than a first threshold value; and estimates the travel path of the vehicle D as a curved road in a case where the vehicle speed of the detection signal of the vehicle speed sensor is the threshold value or more and the steering angle of the detection signal of the steering angle sensor is the first threshold value or more and less than a second threshold value; and further estimates the travel path of the vehicle D as an intersection in a case where the vehicle speed of the detection signal of the vehicle speed sensor is less than the threshold value and the steering angle of the detection signal of the steering angle sensor is the second threshold value or more. It is to be noted that information about the vehicle D of a detection signal of the yaw rate sensor and a detection signal of the acceleration sensor may be added to the information about the detection signal of the vehicle speed sensor and the detection signal of the steering angle sensor.

Here, as shown in FIG. 2 and FIG. 3, in a case where a rear lateral side (a rear right side) of the cruising vehicle D is captured as an image by the imaging device 1, as shown in the image P of FIG. 3, such another vehicle E as an object is captured as an image at a lower left side so as to be larger in size as it becomes more proximal to the cruising vehicle D, and such another vehicle E is captured as an image at an upper right side so as to be smaller as it becomes more distant from the cruising vehicle D. As a result, by a relative distance between the cruising vehicle D and such another vehicle E, the size and location in which such another vehicle E is captured as an image can be specified to a certain extent. Thus, in a case where pattern matching is carried out, the sizes of the detection frames (detection windows) A1 to AN, B1 to BN, and C1 to CN to scan such another vehicle E and detection areas A, B, and C to scan such another vehicle E can be divided into a plurality of sections by the relative distance between the cruising vehicle D and such another vehicle E.

The area setting unit 6, as shown in FIG. 2 and FIG. 3, sets the image P of one frame from the imaging device 1 in a plurality of three different sized detection areas A, B, and C of large, middle, and small sizes in this example.

The detection area A of the large (a maximum) size is a most proximal area with respect to the vehicle D, the detection area C of the small (a minimum) size is a most distal area with respect to the vehicle D, and the detection area B of the middle size is an intermediate area between the detection area A of the large size and the detection area C of the small size. The detection area A of the large size includes the detection area B of the middle size and the detection area C of the small size. The detection area B of the middle size includes the detection area C of the small size.

The detection area setting unit 6 sets the detection areas A, B, and C of the large, middle, and small sizes, according to the while line 11 that is processed to be detected at the white line detection processing unit 4 and on the basis of a result of estimation from the travel path estimation unit 5.

In a case where the white line 11 is detected at the white line detection processing unit 4, an outside vertical line of the detection area A of the large size is set on the white line 11 or at a position which is based on the white line 11. It is to be noted that an inside vertical line of the detection area A of the large size is fixed and set. Also, the outside vertical line and the inside vertical line of the detection area C of the small size, are set on the white line 11 or at the position that is based on the white line 11. Thus, the outside vertical line of the detection area A of the large size and the outside vertical line and the inside vertical line of the detection area C of the small size, vary on the basis of the white line 11. As a result, there is no problem if a gap between the white line 11 of the curved road and the white line 11 of the straight road increases as it goes to the rear side (a distal side) of the vehicle D. That is, even if the road on which the vehicle D is travelling is a curved road or a straight road, the detection areas A to C of the different sizes can be set according to the curved road or the straight road. It is to be noted that the inside vertical line of the detection area C of the small size is always positioned to be inner than the inside vertical line of the detection area A of the large size, and the detection area C of the small size is included in the detection area A of the large size. The detection area B of the middle size is included in the detection area A of the large size, and includes the detection area C of the small size therein.

In a case where the white line 11 is not detected at the white line detection processing unit 4, the detection area A of the large size is set to a default (a default value). Also, the detection area C of the small size is set according to the travel path, or alternatively, is set to a default (a default value). It is to be noted that the default (the default value) of the detection area A of the large size and the default (the default value) of the detection area C of the small size are the optimized fixed values. The detection area C of the small size varies according to the travel path. As a result, even if the road on which the vehicle D is travelling is a curved road or a straight road, the detection areas A and C of the different sizes can be set. It is to be noted that the detection area of the small size is included in the detection area A of the large size. The detection area B of the middle size is included in the detection area A of the large size, and includes the detection area C of the small size therein.

A upper side horizontal line and a lower side horizontal line of a respective one of the three detection areas A, B, and C are respectively set at appropriate aspect ratios on the basis of the inside and outside lateral vertical lines. The detection area B of the middle size is set to be equally divided into a plurality of sections according to the detection area A of the large size and the detection area C of the small size, or alternatively, is appropriately set.

The three area processing units 7, 8, and 9 respectively carry out detection processing operations as to whether such another vehicle E which is an object is present or absent simultaneously in parallel to each other, by way of pattern matching in the three detection areas A, B, and C that are set by the detection area setting unit 6.

Figure 4:
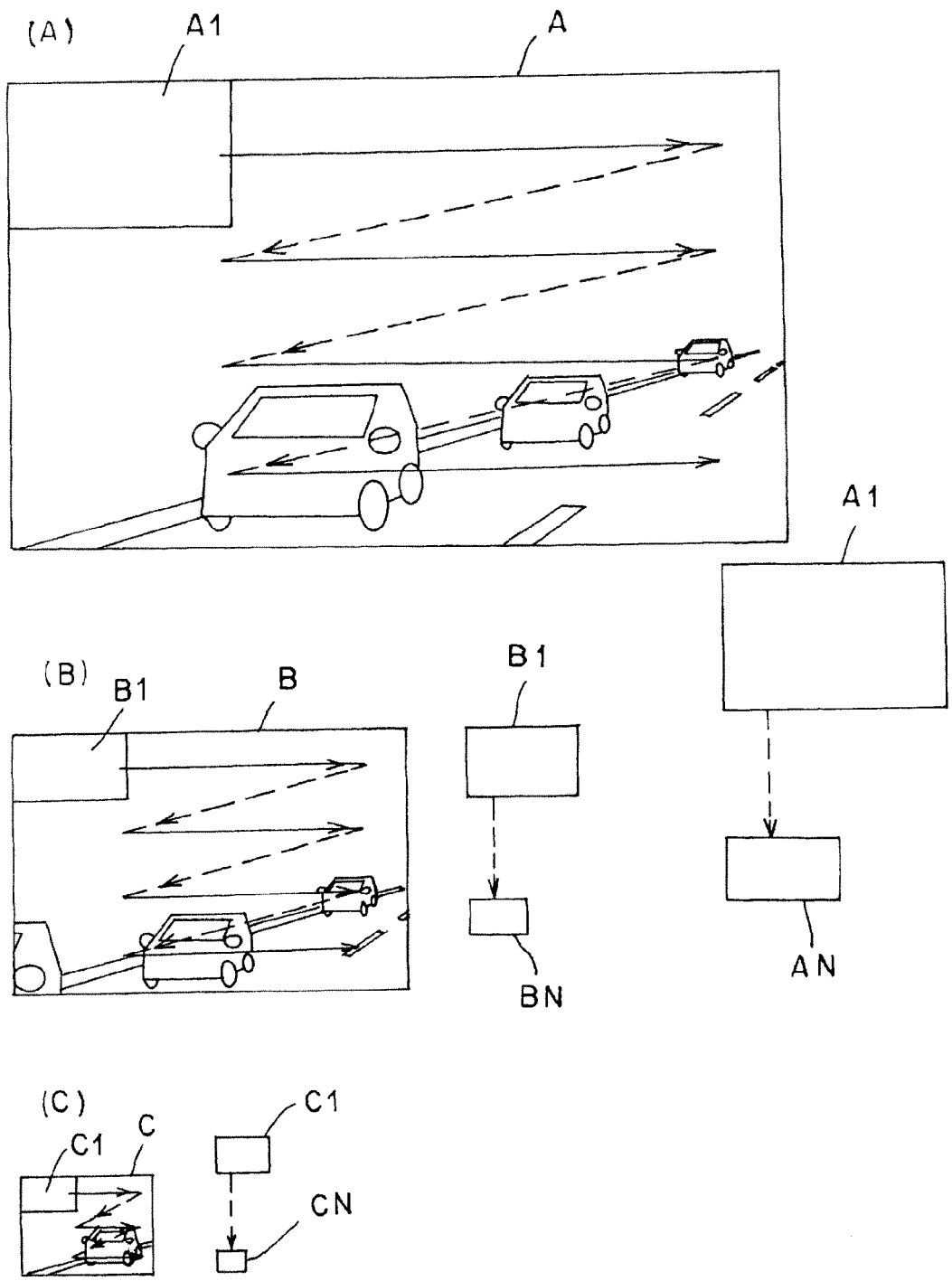
FIG. 4 is an explanatory view showing a state in which detection processing operations of pattern matching in the respective three detection areas are carried out simultaneously.

The area processing unit 7 to scan the detection area A of the large size scans the detection area A of the large size of the image P of one frame, and carries out detection processing as to whether such another vehicle E is present or absent, as indicated by the solid arrow and the dashed arrow in FIG. 4 (A), by way of a plurality of the detection frames A1 to AN that are suitable for the detection area A of the large size.

The area processing unit 8 to scan the detection area B of the middle size scans the detection area B of the large size of the image P of one frame, and carries out detection processing as to whether such another vehicle E is present or absent, as indicated by the solid arrow and the dashed arrow in FIG. 4 (B), by way of a plurality of the detection frames B1 to BN that are suitable for the detection area B of the large size.

The area processing unit 9 to scan the detection area C of the small size scans the detection area C of the large size of the image P of one frame, and carries out detection processing as to whether such another vehicle E is present or absent, as indicated by the solid arrow and the dashed arrow in FIG. 4 (C), by way of a plurality of the detection frames C1 to CN that are suitable for the detection area C of the large size.

Figure 5:
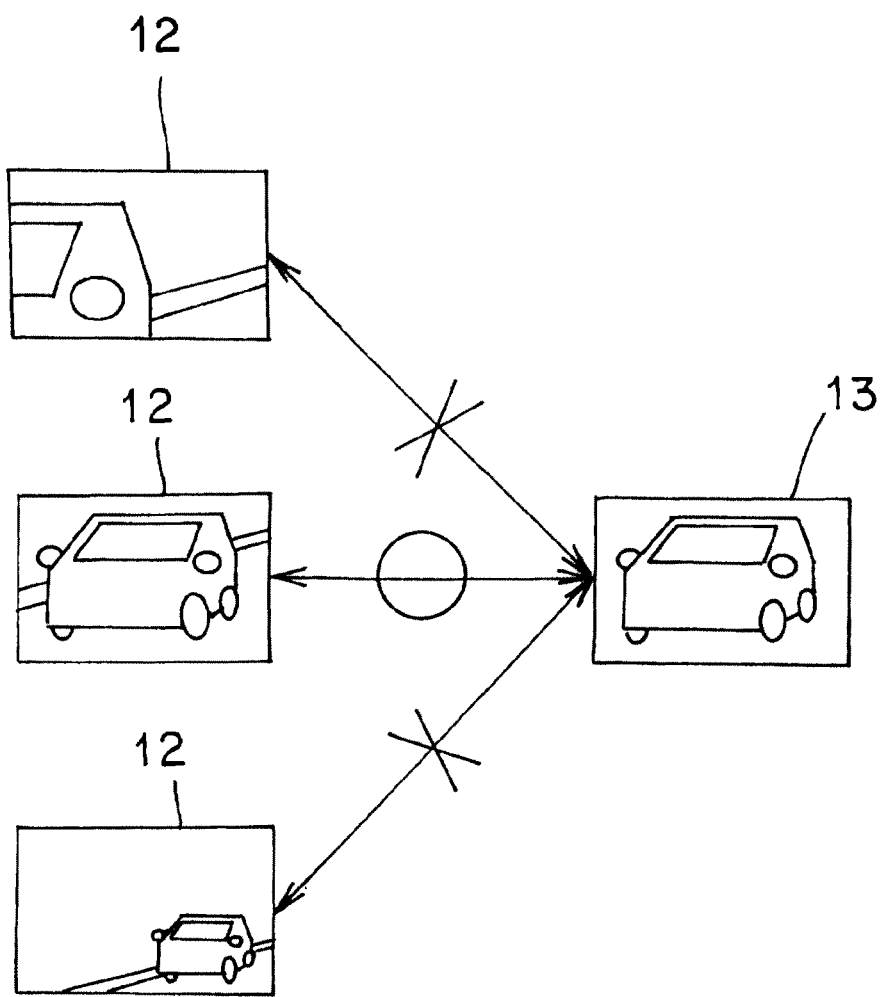
FIG. 5 is an explanatory view showing a result of detection processing operations of pattern matching.

In the detection processing of the three area processing units 7, 8, and 9, as shown in FIG. 5, features of an image 12 in a scanned detection frame and features of a learned reference image 13 are compared with each other, and in a case where a coincident feature exceeds a threshold value, a result of detection indicative of the fact that another vehicle E is present is output as being coincident (refer to the mark O in FIG. 5). On the other hand, in a case where the coincident feature does not exceed the threshold value, a result of detection indicative of the fact that another vehicle E is absent is output as not being coincident (refer to the marks X in FIG. 5).

The integration processing unit 10 integrates and outputs three detection results which are respectively obtained by the detection processing operations made by the area processing units 7, 8, and 9. That is, the integration processing unit 10 outputs the presence or absence of such another vehicle E as an object which is a respective one of the three detection results, to the other device, for example, an alerting device (not shown) or a display device (not shown). The alerting device outputs alerting in a case where such another vehicle E is present, and the display device displays such another vehicle E in the case where such another vehicle E is present.

(Description of Operation of Embodiment)

Figure 6:
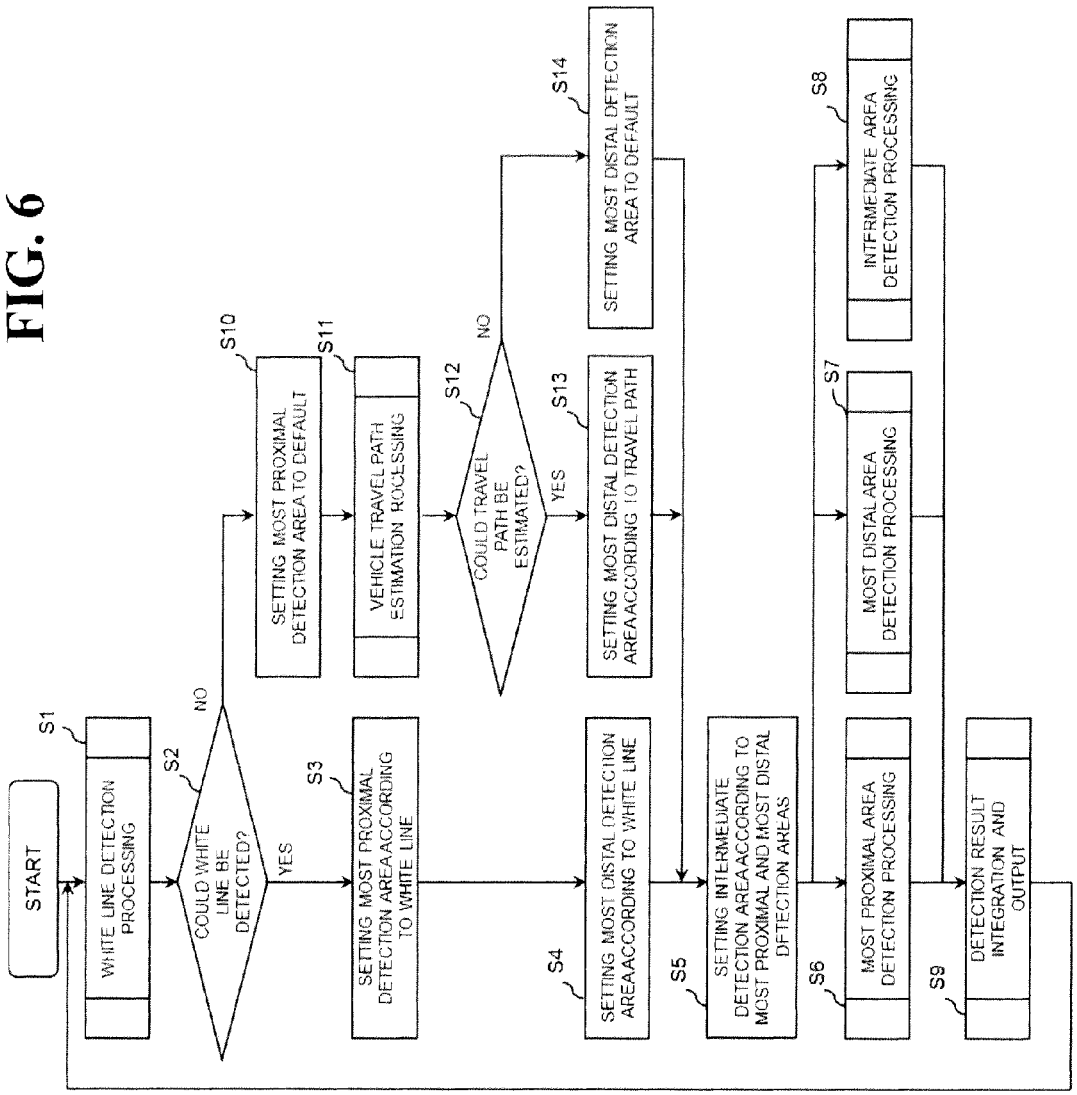
FIG. 6 is a flowchart showing an exemplary operation.

The object detection device for area around vehicle, according to the embodiment, is made of the constituent elements as described above, and hereinafter, an operation thereof will be described referring to the flowchart of FIG. 6.

First, start is established by turning ON an ignition switch (not shown). At this time, the imaging device 1 captures an image of the periphery (the rear lateral side) of the vehicle (the cruising vehicle) D, and outputs the image P to a respective one of the white line detection processing unit 4 of the image processing device 3 and the three area processing units 7, 8, and 9. Also, the detection device 2 detects information about the vehicle (the cruising vehicle) D, and outputs the detection signal to the travel path estimation unit 5 of the image processing device 3.

Here, the white line detection processing unit 4 of the image processing device 3 carries out detection processing of the white line 11 on the basis of the image P from the imaging device 1, and outputs a result of the detection processing to the detection area setting unit 6 (white processing detection processing: S1).

The detection area setting unit 6 determines whether or not the white line 11 could be detected, on the basis of the detection processing result from the white line detection processing unit 4 (Could white line be detected? S2).

In a case where the white line 11 has been detected, the detection area setting unit 6 sets the detection area A of the large size, according to the white line 11 (Setting most proximal detection area according to white line: S3). Also, the detection area setting unit 6 sets the detection area C of the small size, according to the white line 11 (Setting most distal detection area according to white line: S4). Further, the detection area setting unit 6 sets the detection area B of the middle size, according to the detection area A of the large size and the detection area C of the small size (Setting intermediate detection area according to most proximal and most distal detection areas: S5).

The area A processing unit 7, as shown in FIG. 4 (A), scans, by way of the plurality of detection frames A1 to AN, the detection area A of the large size that is set by the detection area setting unit 6 in the image P of one frame from the imaging device 1; carries out detection processing as to whether another vehicle E is present or absent; and outputs a result of the detection processing to the integration processing unit 10 (Most proximal area detection processing: S6).

The area C processing unit 9, as shown in FIG. 4 (C), scans, by way of the plurality of detection frames C1 to CN, the detection area C of the small size that is set by the detection area setting unit 6 in the image P of one frame from the imaging device 1; carries out detection processing as to whether another vehicle E is present or absent; and outputs a result of the detection processing to the integration processing unit 10 (Most distal area detection processing: S7).

The area B processing unit 8, as shown in FIG. 4 (B), scans, by way of the plurality of detection frames B1 to BN, the detection area B of the large size that is set by the detection area setting unit 6 in the image P of one frame from the imaging device 1; carries out detection processing as to whether another vehicle E is present or absent; and outputs a result of the detection processing to the integration processing unit 10 (Intermediate area detection processing: S8).

The most proximal area detection processing S6 of the area A processing unit 7, the most distal area detection processing S7 of the area C processing unit 9, and the intermediate area detection processing S8 of the area B processing unit 8 are carried out simultaneously in parallel to each other. At the three area processing units 7, 8, and 9, as shown in FIG. 5, features of the image 12 in the scanned detection frame and features of the learned reference image 13 are compared with each other, and in a case where a coincident feature exceeds a threshold value, a detection result indicative of the fact that another vehicle E is present is output as being coincident (refer to the mark O in FIG. 5). On the other hand, in a case where the coincident feature does not exceed the threshold, a detection result indicative of the fact that another vehicle E is absent is output as not being coincident (refer to the marks X in FIG. 5).

The integration processing unit 10 integrates: a result of the most proximal area detection processing of the area A processing unit 7; a result of the most distal area detection processing of the area C processing unit 9; and a result of the intermediate area detection processing of the area 13 processing unit 8 with each other, and outputs the presence or absence of another vehicle E as an object to an alerting device or a display device as the other device, and the routine reverts to the step (S1) as mentioned previously (Detection result integration and output: S9).

In the step (S2) as mentioned previously, in a case where the white line 11 is not detected, the detection area setting unit 6 sets the detection area A of the large size to a default (Setting most proximal detection area to default: S10).

Next, the travel path estimation unit 5 carries out estimation processing as to whether the road on which the cruising vehicle D is travelling is a curved road or an intersection, on the basis of the vehicle information from the detection device 2, and outputs a result of the estimation processing to the detection area setting unit 6 (Vehicle travel path estimation processing: S11).

The detection area setting unit 6 determines whether or not the travel path could be estimated, on the basis of the estimation processing result from the travel path estimation unit 5 (Could travel path be estimated? S12).

In a case where the travel path could be estimated, the detection area setting unit 6 sets the detection area C of the small size, according to the travel path (Setting most distal detection area according to travel path: S13). Also, the detection area setting unit 6 carries out the step (S5) as mentioned previously.

Next, the area A processing unit 7 carries out the step (S6) as mentioned previously; the area C processing unit 9 carries out the step (S7) mentioned previously; and the area B processing unit 8 carries out the step (S8) as mentioned previously, simultaneously in parallel to each other. Also, the integration processing unit 10 carries out the step (S9) as mentioned previously, and the routine reverts to the step (S1) as mentioned previously.

In the step (S12) as mentioned previously, in a case where the travel path could not be estimated, the detection area setting unit 6 sets the detection area C of the small size to a default (Setting most distal detection area to default: S14). Also, the detection area setting unit 6 carries out the step (S5) as mentioned previously.

Next, the area A processing unit 7 carries out the step (S6) as mentioned previously; the area C processing unit 9 carries out the step (S7) as mentioned previously; and the area 13 processing unit 8 carries out the step (S8) as mentioned previously simultaneously in parallel to each other. Also, the integration processing unit 10 carries out the step (S9) as mentioned previously, and the routine reverts to the step (S1) as mentioned previously.

(Description of Advantageous Effects of Embodiment)

The object detection device for area around vehicle, according to the embodiment, is made of the constituent elements and functions as described above, and hereinafter, advantageous effects thereof will be described.

In so far as the object detection device for area around vehicle, according to the embodiment, is concerned, an image P of one frame is set in three detection areas A, 13, and C; in the three detection areas A, B, and C in which the image is set, detection processing operations as to the presence or absence of another vehicle E as an object are respectively carried out by way of pattern matching and thus in a case where detection processing is carried out while an image of one frame is employed as that of a detection area, the detection time can be reduced in comparison with a case in which the detection area A of the large size shown in FIG. 4 (A) is scanned by way of a plurality of detection frames A1 to AN, B1 to BN, and C1 to CN, for example.

In so far as the object detection device for area around vehicle, according to the embodiment, is concerned, the detection area A of the large size includes the detection area B of the middle size and the detection area C of the small size therein, and the detection area B of the middle size includes the detection area C of the small size therein. As a result, another vehicle E as an object belongs to any one of the detection area A of the large size, the detection area B of the middle size, and the detection area C of the small size, and the detection precision of another vehicle E can be improved.

In so far as the object detection device for area around vehicle, according to the embodiment, is concerned, the white line detection processing unit 4 of the image processing device 3 carries out detection processing of the white line 11, and the detection area setting unit 6 of the image processing device 3 sets the three detection areas A, B, and C according to the white line 11 that is processed to be detected. Thus, the three detection areas A, B, and C can be reliably set, and the detection precision of another vehicle E can be improved.

In so far as the object detection device for area around vehicle, according to the embodiment, is concerned, the travel path estimation unit 5 of the image processing device 3 estimates the travel path of the cruising vehicle D on the basis of the vehicle information from the detection device 2, and sets the three detection areas A, B, and C according to the travel path of the cruising vehicle D that is estimated by the detection area setting unit 6 of the image processing device 3. Thus, the three detection areas A, B, and C can be reliably set, and the detection precision of another vehicle E can be improved.

In so far as the object detection device for area around vehicle, according to the embodiment, is concerned, the detection area that is set by the detection area setting unit 6 is made of: a detection area A of a large size; a detection area C of a small size; and an intermediate detection area B set between the detection area A of the large size and the detection area C of the small size. As a result, the detection time can be further reduced, and the detection precision can be further improved.

(Description of Examples Other than Embodiment)

It is to be noted that, in the embodiment as described previously, the presence or absence of another vehicle E that is an object at a rear lateral side of the cruising vehicle D is detected. However, in the present invention, the presence or absence of an object (for example, a pedestrian, a bicycle, or another vehicle) at a front side of a vehicle (the cruising vehicle D) may be detected.

Also, in the embodiment as described previously, one intermediate detection area B is set between the detection area A of the large size and the detection area C of the small size. However, in the present invention, the intermediate detection area may not be set, or alternatively, a plurality of intermediate detection areas may be set. In a case where the plurality of intermediate detection areas are set, a variation of an area of an object, which is exerted by a variation of a distance, is smaller at a more distal side; and therefore, the setting may be provided so as to be higher in density at the more distal side. The setting of an intermediate detection area should be provided in view of a good balance between reduction of the detection time and improvement of the detection precision and manufacturing costs.

Further, in the embodiment as described previously, the white line detection processing unit 4 of the image processing device 3 carries out detection processing of the white line 11; the travel path estimation unit 5 of the image processing device 3 estimates the travel path of the cruising vehicle D on the basis of the vehicle information from the detection device 2; and the detection area setting unit 6 of the image processing device 3 sets three detection areas A, B, and C, according to the white line 11 that is processed to be detected and the estimated travel path. However, in the present invention, it may be that the white line detection processing unit 4 of the image processing device 3 carries out detection processing of the white line 11, and the detection area setting unit 6 of the image processing device 3 sets a plurality of detection areas, according to the white line 11 that is processed to be detected, or alternatively, it may be that the travel path estimation unit 5 of the image processing device 3 estimates the travel path of one's one vehicle D on the basis of the vehicle information from the detection device 2, and the detection area setting unit 6 of the image processing device 3 sets a plurality of detection areas, according to the travel path that is estimated by the detection area setting unit 6.

Furthermore, in the embodiment as described previously, the three area processing units 7, 8, and 9, as shown in FIG. 4 (A), FIG. 4 (B), and FIG. 4 (C), scan the detection areas A, B, and C of the image P of one frame by way of a plurality of detection frames A1 to AN, B1 to BN, and C1 to CN which is suitable for the detection areas A, B, and C, and carry out detection processing operations as to the presence or absence of another vehicle E simultaneously in parallel to each other. However, in the present invention, a plurality of area processing units may carry out detection processing operations as to the presence or absence of an object of Patent Literature 1 simultaneously in parallel to each other. That is, it may be that detection frames of which sizes are fixed (for example, A1, B1, and C1) are scanned while the detection areas A, B, and C of the image P of one frame are resized by increasing or decreasing these areas in a plurality of steps, and detection processing as to the presence or absence of another vehicle E is carried out simultaneously in parallel with the scanning.

Still furthermore, in the embodiment as described previously, the imaging device 1 is mounted to each of the left and right sides of the vehicle D, for example, to the mirror base of the outside mirror device that is equipped at each of the left and right doors of the vehicle D, or alternatively, on the vehicle body of the vehicle D. However, in the present invention, the position at which the imaging device 1 is to be mounted is not limited in particular.

DESCRIPTION OF REFERENCE NUMERALS

1 Imaging device
2 Detection device
3 Image processing device
4 White line detection processing unit
5 Travel path estimation unit
6 Detection area setting unit
7 Area A processing unit
8 Area B processing unit
9 Area C processing unit
10 Integration processing unit
11 White line
12 Image in detection frame 13 Reference image
A Detection area of large size
B Detection area of middle size
C Detection area of small size
D Vehicle (cruising vehicle)
E Another vehicle
P Image

The invention claimed is:

1. An object detection device for an area around a vehicle, comprising:
   an imaging device to capture a periphery of the vehicle as an image; and
   an image processing device to process an image of the periphery of the vehicle which is captured by the imaging device and then output a detection result, wherein
   the image processing device is comprised of:
   a detection area setting unit to set a plurality of detection areas of different sizes in the image of one frame;
   a plurality of area processing units to respectively carry out detection processing operations as to whether the object is present or absent simultaneously in parallel to each other by way of pattern matching in the plurality of the detection areas of different sizes that are set by the detection area setting unit;
   an integration processing unit to integrate and output a plurality of detection results that are respectively processed to be detected by the plurality of the area processing units, wherein: the plurality of detection areas of different sizes comprises a detection area of a large size and a detection area of a small size, and the detection area of the large size includes the detection area of the small size; and
   a white line detection processing unit to carry out detection processing of a white line of a road,
   wherein the detection area setting unit is configured to set the detection area of the large size and to set the detection area of the small size, according to the white line that is processed to be detected at the white line detection processing unit.

2. The object detection device for the area around the vehicle, according to claim 1, wherein the detection area that is set by the detection area setting unit is made of:
   the detection area of a large size;
   the detection area of a small size; and
   one or a plurality of intermediate detection areas which is or are set between the detection area of the large size and the detection area of the small size.

3. An object detection device for an area around a vehicle, comprising:
   an imaging device to capture a periphery of the vehicle as an image; and
   an image processing device to process an image of the periphery of the vehicle which is captured by the imaging device and then output a detection result, wherein
   the image processing device is comprised of:
   a detection area setting unit to set a plurality of detection areas of different sizes in the image of one frame;
   a plurality of area processing units to respectively carry out detection processing operations as to whether the object is present or absent simultaneously in parallel to each other by way of pattern matching in the plurality of the detection areas of different sizes that are set by the detection area setting unit; and
   an integration processing unit to integrate and output a plurality of detection results that are respectively processed to be detected by the plurality of the area processing units,
   wherein:
   the plurality of detection areas of different sizes comprises a detection area of a large size and a detection area of a small size
   the detection area of a large size is a proximal area of the vehicle,
   the detection area of a small size is a distal area of the vehicle, and
   the detection area of the large size includes the detection area of the small size.

4. An object detection device for an area around a vehicle, comprising:
   an imaging device to capture a periphery of the vehicle as an image;
   a detection device to detect vehicle information; and
   an image processing device to process an image of the periphery of the vehicle which is captured by the imaging device and then output a detection result, wherein
   the image processing device is comprised of:
   a detection area setting unit to set a plurality of detection areas of different sizes in the image of one frame;
   a plurality of area processing units to respectively carry out detection processing operations as to whether the object is present or absent simultaneously in parallel to each other by way of pattern matching in the plurality of the detection areas of different sizes that are set by the detection area setting unit;
   an integration processing unit to integrate and output a plurality of detection results that are respectively processed to be detected by the plurality of the area processing units, wherein: the plurality of detection areas of different sizes comprises a detection area of a large size and a detection area of a small size, and the detection area of the large size includes the detection area of the small size; and
   a travel path estimation unit to estimate a travel path o he vehicle, based on the vehicle information from the detection device,
   wherein the detection area setting unit is configured to set the detection area of the large size to a default, to set the detection area of the small size, according to the travel path, or alternatively, to set the detection area of the small size to a default, based on an estimation result from the travel path estimation unit.

5. An object detection device for an area around a vehicle, comprising:
   an imaging device to capture a periphery of the vehicle as an image;
   a detection device to detect vehicle information; and
   an image processing device to process an image of the periphery of the vehicle which is captured by the imaging device and then output a detection result, wherein
   the image processing device is comprised of:
   a detection area setting unit to set a plurality of detection areas of different sizes in the image of one frame;
   a plurality of area processing units to respectively carry out detection processing operations as to whether the object is present or absent simultaneously in parallel to each other by way of pattern matching in the plurality of the detection areas of different sizes that are set by the detection area setting unit;
   an integration processing unit to integrate and output a plurality of detection results that are respective processed to be detected by the plurality of the area processing units wherein: the plurality of detection areas of different sizes comprises a detection area of a large size and a detection area of a small size, and the detection area of the large size includes the detection area of the small size;

a white line detection processing unit to carry out detection processing of a white line of a road; and a travel path estimation unit to estimate the travel path of the vehicle, based on the vehicle information from the detection device, wherein the detection area setting unit is configured to set the detection area of the large size, and to set the detection area of the small size, according to the white line that is processed to be detected at the white line detection processing unit or alternatively, to set the detection area of the large size to a default, based on the white line detection processing unit, and to set the detection area of the small size, according to the travel path, or alternatively, to set the detection area of the small size to a default based on an estimation result from the travel path estimation unit.

* * * * *